United States Patent [19]

Kim

[11] Patent Number: 5,453,801
[45] Date of Patent: Sep. 26, 1995

[54] METHOD AND APPARATUS FOR DETECTING MOTION VECTORS IN A FRAME DECIMATING VIDEO ENCODER

[75] Inventor: Keun-Hwan Kim, Seoul, Rep. of Korea

[73] Assignee: Daewoo Electronics Co. Ltd., Seoul, Rep. of Korea

[21] Appl. No.: 276,235

[22] Filed: Jul. 18, 1994

[30] Foreign Application Priority Data

Jul. 16, 1993 [KR] Rep. of Korea ............ 93-13514

[51] Int. Cl.⁶ .................. H04N 7/24; H04N 7/36
[52] U.S. Cl. ........................ 348/699; 348/416
[58] Field of Search ............... 348/699, 407, 348/412, 402, 384, 424, 426, 416; H04N 7/24, 7/36

[56] References Cited

U.S. PATENT DOCUMENTS

| | | | |
|---|---|---|---|
| 5,134,464 | 7/1992 | Basile et al. | 348/426 |
| 5,161,001 | 11/1992 | Pele et al. | 348/424 |
| 5,173,773 | 12/1992 | Ueda et al. | 348/407 |
| 5,191,414 | 3/1993 | Sugiyama | 348/415 |
| 5,253,054 | 10/1993 | Fujiwara | 348/384 |

FOREIGN PATENT DOCUMENTS

| | | | |
|---|---|---|---|
| 0346637 | 12/1989 | European Pat. Off. | H04N/7/32 |
| 0397206 | 11/1990 | European Pat. Off. | H04N/7/32 |
| 0518314 | 12/1992 | European Pat. Off. | H04N/7/32 |

OTHER PUBLICATIONS

Min-Kyu Kim, et al, "A Motion Adaptive Hybrid Coding for HDTV Signals" Siganl Processing of HDTV, 3., 6 Sep. 1991, pp. 448–454.

*Primary Examiner*—Tommy P. Chin
*Assistant Examiner*—Vu Le
*Attorney, Agent, or Firm*—Anderson Kill Olick & Oshinsky

[57] ABSTRACT

An improved motion estimating method serves to determine a set of target motion vectors between a current and its previous selected frames, wherein N number of frames are skipped between the current and the previous selected frames, the N being a positive integer inclusive of 1. This method is implemented through the use of all frames, i.e., the current and the previous selected frames and the N number of skipped frames in order to obtain a series of motion vectors for one of the search blocks within the current selected frame. The series of motion vectors is then summed up to define a target motion vector representing the displacement between the one of the search blocks and the corresponding best matching block in the previous selected frame. The process is repeated until the set of target motion vectors for all of the search blocks contained in the current selected frame are detected.

2 Claims, 4 Drawing Sheets

METHOD AND APPARATUS FOR DETECTING MOTION VECTORS IN A FRAME DECIMATING VIDEO ENCODER

FIELD OF THE INVENTION

The present invention relates to a method and apparatus for encoding a video signal; and, more particularly, to a method and an apparatus for estimating a motion vector in a frame decimating video encoder employing frame decimation and interframe coding techniques for data compression.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

Several methods for estimating the displacement of an object in a video sequence have been proposed. Generally, they can be classified into two types: pixel recursive algorithm; and block matching algorithm(see, e.g., J. R. Jain et al., "Displacement Measurement and Its Application in Interframe Image Coding", *IEEE Transactions of Communications* COM-29, No. 12(December 1981)). The present invention is primarily concerned with the block matching algorithm, which is the more frequently used algorithm in the art.

According to the block matching algorithm, a current frame is divided into a multiplicity of search blocks. The size of a search block typically ranges between 8×8 and 32×32 pixels. To determine a motion vector for a search block in the current frame, a similarity calculation is performed between the search block of the current frame and each of a plurality of equal-sized candidate blocks included in a generally larger search region within a reference frame, e.g., a preceding frame. An error function such as the mean absolute error or mean square error is used to carry out a similarity measurement between the search block of the current frame and each of the candidate blocks in the search region. And a motion vector, by definition, represents the displacement between the search block and a best matching block, i.e., a candidate block which yields a minimum error function. In a motion compensated coding method, the coding performance depends heavily on the accuracy of the motion vector.

Another compression technique which can be implemented readily is a frame decimation method, which reduces the amount of data by encoding and transmitting only selected frames of video image and skipping or decimating the remaining frames existing therebetween(see, e.g., "Video Codec for Audiovisual Services at p×64 kb/s," CCITT Recommendation H.261, CDM XV-R 37-E, International Telegraph and Telephone Consultative Committee (CCITT), August 1990).

Usually, the input to the video encoder is a video signal of 30 frames/sec. The frame rate resulting from the skipping of one, two or three frames between every two encoded frames is typically 15, 10 or 7.5 frames/sec, respectively.

In a conventional video encoder which employs both the hybrid coding and the frame decimation techniques, the selected frames of the video signal are encoded using both interframe and trans,form coding methods, and the motion vectors obtained from the interframe coding are detected between two successive encoded frames. Since some of the frames are skipped, the motion gap or displacement between two successive encoded frames becomes abrupt than that of the undecimated original video signal, which leads to the generation of larger motion vectors. Therefore, to detect an optimum motion vector between two encoded frames, a larger search region in the previous encoded frame should be used with its size depending on the frame rate of the encoded frames or degree of decimation. Since the computational complexity of the block matching algorithm is normally proportional to the size of the search region, a larger computational burden for estimating the motion vectors may be imposed on the video encoder which adopts the frame decimation technique.

SUMMARY OF THE INVENTION

It is, therefore, a primary object of the present invention to provide an improved method and apparatus for detecting motion vectors between two encoded frames in multiple steps for use in a frame decimating video encoder, thereby reducing the overall computational complexity of the video encoder.

In accordance with the present invention, there is provided a method for determining a set of motion vectors between a current and its previous selected frames, wherein N number of frames are skipped between the current and the previous selected frames, said N being a positive integer inclusive of 1 and the current selected frame is divided into a plurality of search blocks of an identical size, which comprises the steps of: (a) storing the N skipped frames; (b) setting one of the search blocks taken from the plurality of search blocks as a reference search block; (c) determining, for the reference search block, a best matching block included in a corresponding search region in the ith skipped frame, thereby generating an ith motion vector representing the displacement between the reference search block and the best matching block and setting the best matching block as the reference search block, wherein i is a number selected in the ascending order from 1 to N; (d) storing the ith motion vector; (e) repeating said steps (c) through (d) above until the first to the Nth motion vectors are obtained; (f) determining, for the reference search block, a best matching block included in a corresponding search region in the previous selected frame, thereby generating an (N+1)st motion vector representing the displacement between the reference search block and the best matching block; (g) summing up the (N+1) motion vectors so as to provide a motion vector representing the displacement between said one of the search blocks and the corresponding best matching block in the previous selected frame; and (h) repeating said steps (b) through (g) above until the set of motion vectors for all of the search blocks are detected.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
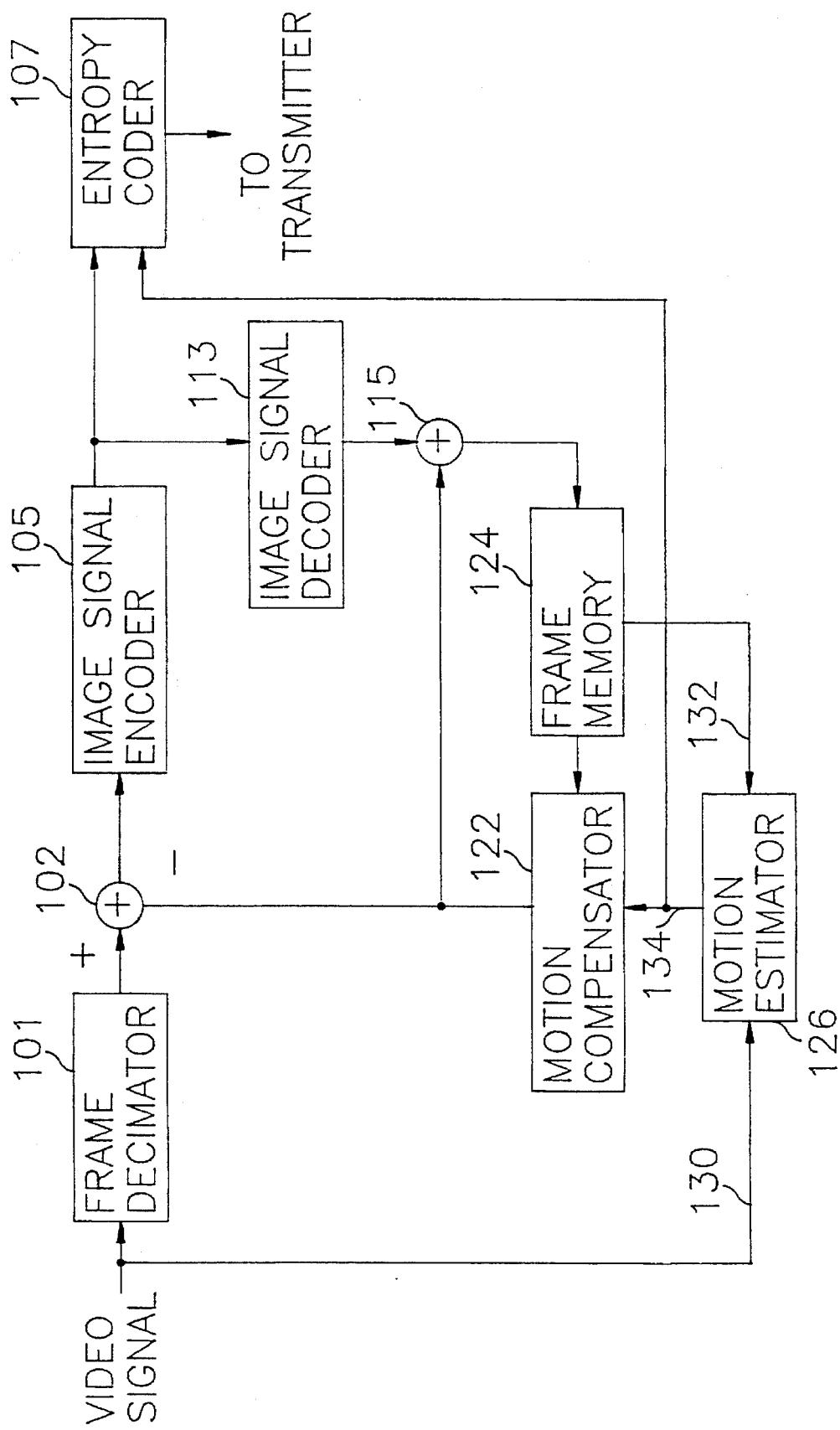
FIG. 1 is a block diagram of a video encoder that employs a motion estimator of the present invention.

With reference to FIG. 1, there is shown a block diagram of a video encoder which employs a motion estimator 126 of the present invention. A video signal is fed to a frame decimator 101 and the motion estimator 126 of the present invention. At the frame decimator 101, frames to be encoded are selected by skipping the intervening frames therebetween at a predetermined frame decimation ratio representing the degree of decimation, and fed to a subtracter 102. For example, the frame decimator 101 selects every other or every third frame of the video signal if the predetermined decimation ratio is 2 or 3, respectively.

Actually, the selected frames of the video signal are read, on a block-by-block basis, from an input memory (not shown) wherein each frame is stored as successive blocks of pixel data for processing on a block-by-block basis. The block size typically ranges between 8×8 and 32×32 pixels.

At the motion estimator 126 of the present invention, the current selected or skipped frame signal on line 130 and a reconstructed preceding encoded frame signal on line 132 from a frame memory 124 are processed to calculate and estimate a motion vector which represents the displacement between a search block within the current frame and a best matching block included in a corresponding search region within the previous selected frame. In accordance with the present invention, the motion vectors between two selected frames are detected in multiple steps as described hereinafter with reference to FIGS. 2A and 3.

The motion vector on line 134 provided from the motion estimator 126 is applied to a motion compensator 122 and to an entropy coder 107.

In response to the motion vector, a prediction signal, i.e., pixel data of the candidate block corresponding to the motion vector, is retrieved from the frame memory 124 and provided to the subtracter 102 and an adder 115 by means of the motion compensator 122.

The prediction signal from the motion compensator 122 is subtracted from the search block of the current frame signal at the subtracter 102; and the resultant data, i.e., an error signal denoting the differential pixel value, is dispatched to an image signal encoder 105, wherein a block of error signals is encoded into a set of quantized transform coefficients by using, e.g., a discrete cosine transform(DCT) and any of the known quantization methods. Thereafter, the quantized transform coefficients are transmitted via two signal paths: one that leads to the entropy coder 107, wherein the quantized transform coefficients are coded together with the motion vector supplied through line 134 by using, for example, a combination of run-length and variable length coding techniques; and the other leads to an image signal decoder 113, wherein the quantized transform coefficients are converted back into a reconstructed differential error signal by using the inverse quantization and inverse transform. Reconstruction of the error signal is required in order for the encoder to monitor the behavior of the decoder in a receiver to thereby prevent the decoder's reconstructed signal from diverging from the current frame signal.

The reconstructed error signal from the image decoder 113 and the prediction signal from the motion compensator 122 are combined at the adder 115 to provide a reconstructed current frame signal to be written onto the frame memory 124.

Figure 2A:
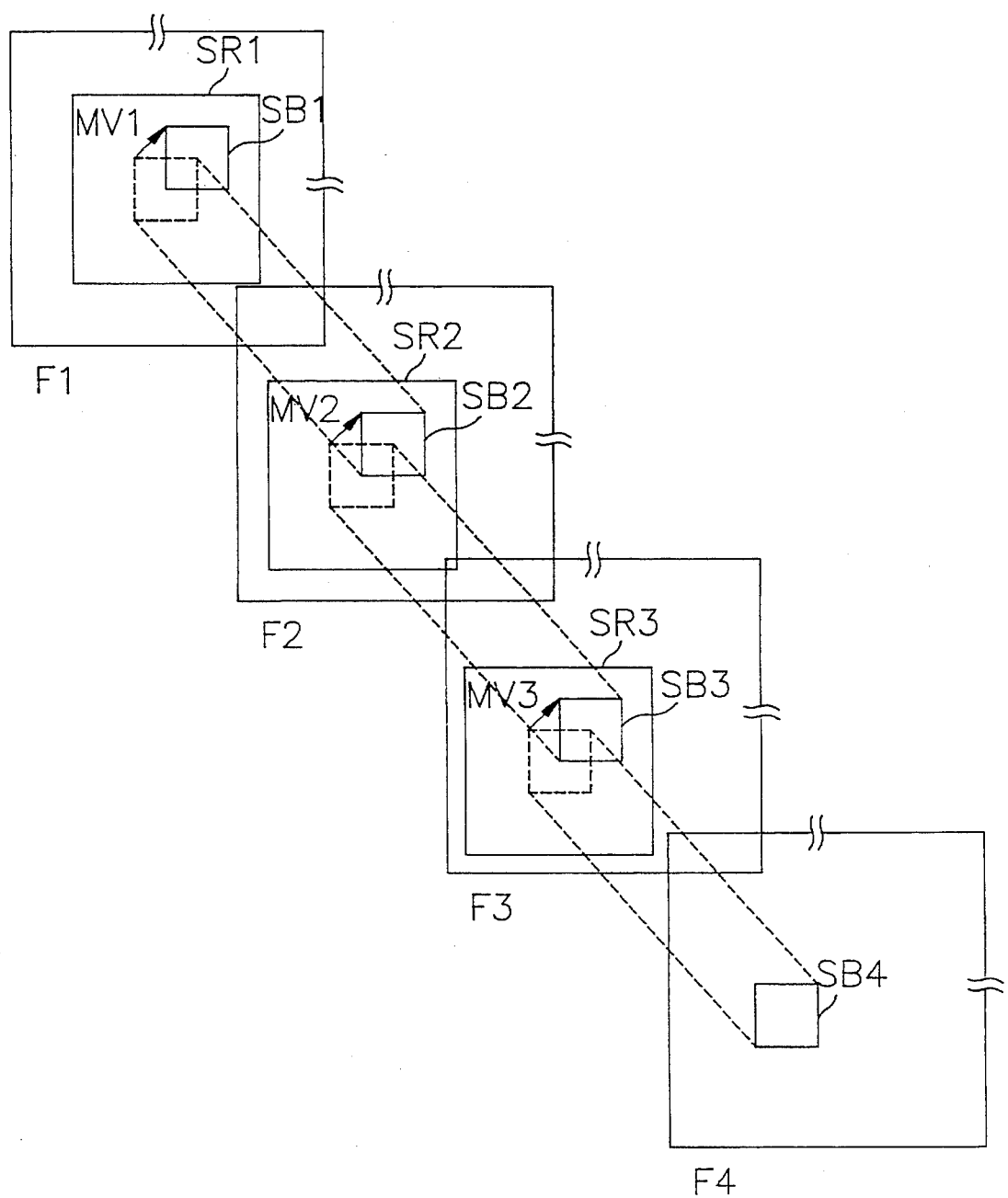
FIGS. 2A and 2B illustrate differences between the inventive method and prior art motion estimation techniques.
Figure 2B:
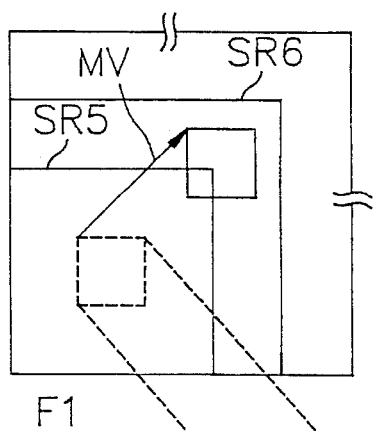
Figure 2B:
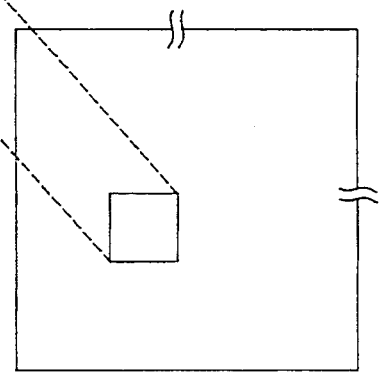

FIGS. 2A and 2B schematically illustrate the motion vector detecting method in accordance with the present invention and the conventional motion vector detecting method, respectively. For the purpose of present illustration, it is assumed that the frame decimation ratio is 3, i.e., two frames are skipped between the preceding encoded frame and the current selected frame to be encoded. FIG. 2A shows a procedure to estimate a motion vector between a current frame F4 and its previous encoded frame F1 stored at the frame memory 124 in accordance with the present invention. Two skipped frames, F2 and F3, are stored in a frame stack 190 shown in FIG. 3. First, a search region SR3 corresponding to a search block SB4 of the current frame F4 is determined in its preceding skipped frame F3. The best matching block of SB4 is decided by evaluating the error function between SB4 and each of the candidate blocks included in the search region SR3 and selecting the minimum value, providing a motion vector MV3 between F4 and F3. Thereafter, with the best matching block SB3 in F3 as a new search block, a corresponding search region SR2, displaced by MV3 from the search region SR3, is determined in F2, i.e., a skipped frame preceding F3. The best matching block of the search block SB3 is detected in SR2, providing a motion vector MV2 between F3 and F2. In a similar manner, a motion vector MV1 between F2 and the previous encoded frame F1 is detected. The final motion vector between the current frame F4 and the previous encoded frame F1 is a vector sum of MV1, MV2 and MV3, representing the displacement between the search block SB4 in F4 and the best matching block SB1 in F1.

The process of estimating a motion vector for a search block in the current frame described above is repeated for all the other search blocks in the current frame.

FIG. 2B shows a procedure for detecting a motion vector between a current frame F4 and its previous encoded frame F1 by using the prior art motion estimation scheme. The best matching block of the search block SB4 is decided directly in a search region in F1. If a search region of the same size as the one used in the method depicted in FIG. 2A, e.g., SR5, is used, the best matching block determined in the previous encoded frame F1 by the method of FIG. 2A will lie outside the boundary of the search region SR5. Therefore, to get a more exact motion vector, a larger search region, e.g., SR6 should be used. Actually, the magnitude of the motion between the current frame and the previous encoded frame largely depends on the frame decimation ratio. Therefore, to get a more exact motion vector, a larger search region in the previous encoded frame in proportion to the frame decimation ratio should be used. If a larger search region, e.g., SR6, is used to get an exact motion vector, the computational complexity for deciding a best matching block in the search region will increase in proportion to the size of the search region. For example, if the size of the search block is 16×16 and the size of the search region in FIG. 2A is 32×32 with the frame decimation ratio of 3, the size of the larger search region SR6 in FIG. 2B will become 64×64. The error function calculation between a search block and a candidate block will be performed 16×16×3 times in case of FIG. 2A method, while it will be performed 48×48 times in case of FIG. 2B method. Accordingly, the FIG. 2A method will impose less computational burden than the FIG. 2B method by a factor of 3 except for the extra computational time required to carry out the multi-step processing.

Figure 3:
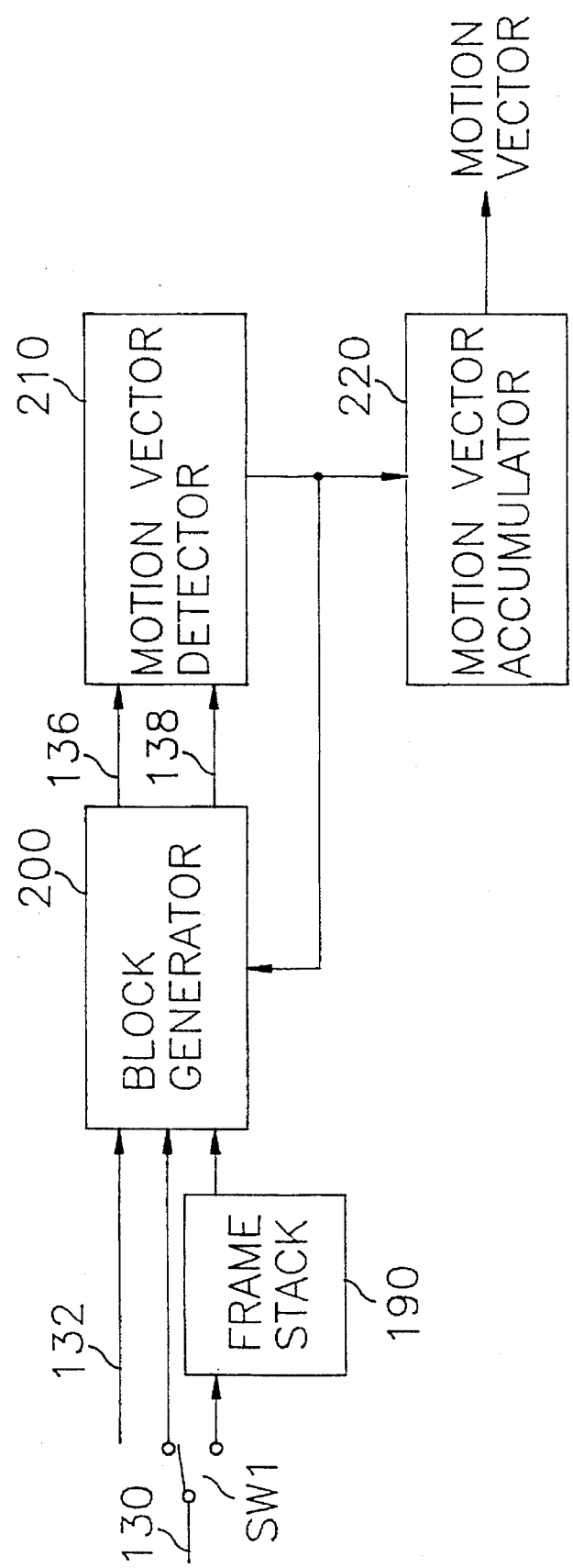
FIG. 3 represents a block diagram of the motion estimator of the present invention.

With reference to FIG. 3, there is shown a detailed block diagram of the motion estimator 126 of the present invention shown in FIG. 1. The previous selected frame retrieved from the frame memory 124, under the control of the video encoder, i.e., operation start, is inputted to a block generator 200 via line 132. The video signal inputted to the motion estimator 126 on line 130 is either fed to a frame stack 190 or fed directly to the block generator 200 by a switch SW1. Specifically, the skipped frames of the video signal are fed to the frame stack 190, stored therein and retrieved therefrom by the block generator 200, while the current selected frame of the video signal is fed directly to the block generator 200. The block generator 200 selects two frames for processing: so as to detect a motion vector therebetween and retrieve a proper search block and a search region included in the two frames as described above in conjunction with FIG. 2A, which are provided to a motion vector detector 210.

First, the block generator 200 selects the current selected frame F4 and the preceding skipped frame F3 shown in FIG. 2A and provides the search block SB4 within the current frame F4 and the corresponding search region SR3 of the preceding skipped frame F3 to the motion vector detector 210.

The motion vector detector 210 detects a best matching block for the search block SB4 from the search region SR3, thereby determining the motion vector MV3 between the search block SB4 and the best matching block in the search region SR3. The motion vector MV3 is fed to a motion vector accumulator 220 to be stored and to the block generator 200.

Based on the input motion vector, a new search block SB3 in the preceding skipped frame F3 and a corresponding search region SR2 in its preceding skipped frame F2 are retrieved and inputted to the motion vector detector 210 by the block generator 200, to thereby determine a new motion vector MV2, which is then sent to the motion vector accumulator 220 to be added to MV3 and to the block generator 200. Such process of detecting, storing and adding a motion vector is repeated between the preceding skipped frame F2 and the previous encoded frame F1. By accumulating the detected motion vectors, e.g., MV1, MV2 and MV3, the motion vector accumulator 220 provides a final motion vector between search block in the current frame and the best matching block in its corresponding search region within the previous encoded frame on line 134. For all of the search blocks in the current frame, the above process is repeated.

Although the present invention has been described with respect to the frame decimation ratio of 3, various frame decimation schemes may be used in encoding a video signal, and the motion vectors may be calculated in a similar manner as presented herein. Accordingly, while the present invention has been described with respect to the particular embodiments, it will be apparent to those skilled in the art that various changes and modifications may be made without departing from the spirit and scope of the invention as defined in the following claims.

What is claimed is:

1. A method for determining a set of target motion vectors between a selected current and its previous selected frames, wherein N number of frames are skipped between the current and the previous selected frames, said N being a positive integer inclusive of 1, and the current selected frame is divided into a plurality of search blocks of an identical size, which comprises the steps of:

(a) storing the N skipped frames;

(b) setting one of the search blocks taken from the plurality of search blocks as a reference search block;

(c) determining, for the reference search block, a best matching block included in a corresponding search region in an ith skipped frame, thereby generating an ith motion vector representing the displacement between the reference search block and the best matching block and setting the best matching block as the reference search block, wherein i is a number selected in the ascending order from 1 to N, the smaller value of i being related to the temporally closer frame to the current selected frame;

(d) storing the ith motion vector;

(e) repeating said steps (c) through (d) above until the first to the Nth motion vectors are obtained;

(f) determining, for the reference search block, a best matching block included in a corresponding search region in the previous selected frame, thereby generating an (N+1)st motion vector representing the displacement between the reference search block and the best matching block;

(g) summing up the (N+1) motion vectors so as to provide a target motion vector representing the displacement between said one of the search blocks and the corresponding best matching block in the previous selected frame; and (h) repeating said steps (b) through (g) above until the set of target motion vectors for all of the search blocks is detected.

2. A motion estimating apparatus for determining a set of target motion vectors between a selected current and its previous selected frames, wherein N number of frames are skipped between the current and the previous selected frames, said N being a positive integer inclusive of 1, and the current selected frame is divided into a plurality of search blocks of an identical size, which comprises:

a memory means for storing the N skipped frames;

a block generation means for providing a reference search block of a frame selected from the current selected frame and the N skipped frames, and a corresponding search region from its temporally closest previous frame selected from the N skipped frames and the previous selected frame, wherein one of the search blocks included in the current frame is being determined as the reference search block if no motion vector is inputted thereto and a best matching block is determined as the reference search block if a motion vector is inputted, generation of the (N+1) reference search blocks and the corresponding search regions thereof being carried out for all of the search blocks;

a motion vector detecting means for determining, for the reference search block, the best matching block included in the corresponding search region, thereby generating one of successive (N+1) motion vectors which represents the displacement between the reference search block and the best matching block; and means for storing and summing up the successive (N+1) motion vectors so as to provide a target motion vector representing the displacement between the one of the search blocks and the corresponding best matching block in the previous selected frame, thereby providing the set of target motion vectors for all of the search blocks.

* * * * *